Patented Mar. 26, 1946

2,397,320

UNITED STATES PATENT OFFICE 2,397,320

PLASTIC COMPOSITION

William W. Koch, Wilmington, Del., assignor to Hercules Powder Company, Wilmington, Del., a corporation of Delaware No Drawing. Application March 21, 1942,
Serial No. 435,639

2 Claims. (Cl. 106—181)

This invention relates to plastic compositions comprising organic acid esters of cellulose and cellulose ethers and more particularly to the addition of certain compounds to make the plastic composition fire resistant.

In certain uses of plastic compositions comprising organic acid esters of cellulose and cellulose ethers, particularly cellulose acetate and ethyl cellulose compositions, it has often been found desirable to obtain a product which is relatively fireproof. These cellulose derivative compositions are not particularly flammable but they will support combustion and this may not be desirable for certain uses such as for coating electric wires where it would be best if a substance were used which would not burst into flame if ignited.

In attempting to flameproof plastic materials, and particularly the highly inflammable nitrocellulose, a large number of compounds have been suggested but they are not fully effective. Many of these well-known flameproofing agents, such as boric acid and the borates and phosphates of alkaline metals, are water soluble and thus would not be useful in such uses as electrical wire or cable coating. Other materials like chlorinated compounds and phosphate esters have been found to be effective fireproof compositions only in very high concentrations such as above 35% of the weight of the plastic. Such plastics are much too soft to be of value for electrical insulation because these materials are active softening agents, particularly for ethyl cellulose. Attempts have been made to use such other materials as tin oxide, silica flour, etc., but they have not been found effective as fireproofing compounds with organic acid esters of cellulose or cellulose ethers.

Now, in accordance with the present invention, it has been found that a fire resistant plastic composition may be made of organic acid esters of cellulose or cellulose ethers to which is added a quantity of a water-insoluble heavy metal salt of carbonic or oxalic acid.

Examples of the compounds which have been found particularly useful are manganous carbonate, nickel carbonate, nickel oxalate, zinc carbonate, basic bismuth carbonate, lead carbonate, lead oxalate, and ferrous oxalate.

The flame-retarding action appears to be due to the fact that these salts decompose at the ignition temperature of the plastic to release incombustible gases which blanket the burning area and smother the fire. Of all of these compounds, manganous carbonate appears to have the best flame-retarding action.

While the amount of the flameproofing compound added may vary considerably, a quantity within the range of about 5% to about 25% of the total weight of the plastic composition can be used without seriously embrittling the composition. For electrical insulation, it has been found most desirable to use about 15% of the compound.

The type molding composition that these flame retarders have been used with are the compositions which are comprised essentially of a thermoplastic organic acid ester of cellulose or a cellulose ether. Of the organic acid esters of cellulose, cellulose acetate is the most important commercially and is particularly useful in this process. In addition, there may be used the other simple esters such as cellulose butyrate and cellulose propionate as well as the mixed esters such as cellulose acetate butyrate, cellulose acetate propionate, cellulose acetate caproate, cellulose acetate stearate, and the like. The cellulose ester utilized should be of the type which is soluble in the usual organic solvents. The degree of substitution will vary somewhat according to the particular ester utilized. For example, in the case of cellulose acetate, the combined acetic acid content is within the range of from about 48.5% to about 59 acetic acid, and preferably within the range from about 53% to about 58%. The cellulose ethers used include ethyl cellulose, propyl cellulose, benzyl cellulose, and the mixed ethers such as ethyl methyl cellulose, ethyl propyl cellulose and ethyl butyl cellulose. The ethoxyl content of the ethyl cellulose may vary from about 43% to about 50% but the type preferably used has an ethoxyl content within the range of about 45% to about 49%.

For the purposes of an electric wire cable coating, a plasticizer is desirable and for this purpose known plasticizers compatible with the particular cellulose derivative may be used. Diphenyl phthalate, triphenyl phosphate, tricresyl phosphate, dimethyl phthalate, diethyl phthalate, diamyl phthalate, dibutyl phthalate, refined mineral oil are particularly useful.

In addition to the cellulose derivative and the plasticizer, various other ingredients ordinarily used in such thermoplastic molding compositions may be incorporated. Thus, pigments or other coloring matter are commonly used and a small amount of filler and mold lubricant may be added with certain of the cellulose derivatives.

In the manufacture of these non-inflammable compounds, the procedure is substantially the same as in the manufacture of the ordinary cellulose derivative plastic materials. The flameproofing compound is added to the mass along with the plasticizer preferably before it is colloided.

The following table shows the results of a number of tests which were performed using ethyl cellulose which is one of the most desirable cellulose derivatives for use as a wire coating. In each of the examples, a composition was prepared according to the formula indicated and was mixed in a Banbury mixer and then worked on heavy rolls. The resulting composition was extruded in the ordinary manner on a copper wire. Ignition experiments were carried out in a hood without a draft. Those compositions which would not burn melted and became blackened by the application of the flame and did not continue to blacken or show any evidence of burning when the flame was removed. The figures represent the parts by weight of each ingredient used in the composition.

alkyl resin), Paraplex RG–8 (diethylene glycol ester of sebacic acid), and Aroplaz 930 (a short nonoxidizing alkyl resin modified with 35% oil) have been used.

The following is an example of a thermoplastic molding composition employing cellulose acetate:

|  | Parts |
|---|---|
| Cellulose acetate (53% to 56% acetic acid content) | 60 |
| Dimethyl phthalate | 10 |
| Diethyl phthalate | 10 |
| Triphenylphosphate | 20 |
| Manganous carbonate | 25 |

The above composition was subjected to a flame as in the case of the ethyl cellulose composition and it would not burn.

While the invention disclosed has been particularly directed to a thermoplastic molding composition for extrusion on wire, the invention applies as well to other molding compositions

TABLE

| Examples | Ethyl cellulose | Tricresylphosphate | Mineral oil | Soft alkyd resin | Isophorone | Manganous carbonate | Nickel carbonate | Nickel oxalate | Zinc carbonate | Basic bismuth carbonate | Lead Carbonate | Lead oxalate | Ferrous oxalate |
|---|---|---|---|---|---|---|---|---|---|---|---|---|---|
| 1 | 80 | 20 | | | | | | | | | | | |
| 2 | 72 | 18 | | | | | 10 | | | | | | |
| 3 | 72 | 18 | | | | 10 | | | | | | | |
| 4 | 68 | | 17 | | | | | | | | | | |
| 5 | 68 | | 17 | | | | | 15 | | | | | |
| 6 | 68 | | 17 | | | | | | 15 | | | | |
| 7 | 68 | | 17 | | | | | | | 15 | | | |
| 8 | 68 | | 17 | | | | | | | | 15 | | |
| 9 | 68 | | 17 | | | | | | | | | 15 | |
| 10 | 68 | | 17 | | | | | | | | | | 15 |
| 11 | 32.4 | 4.8 | | 4.8 | 0.3 | | | | | | | | |
| 12 | 40.7 | 6.1 | | 6.1 | 0.4 | 9.0 | | | | | | | |
| 13 | 40.7 | 6.1 | | 6.1 | 0.4 | | | | 9.0 | | | | |
| 14 | 40.7 | | 4.9 | 7.3 | 0.4 | 9.0 | | | | | | | |
| 15 | 40.7 | 4.9 | | 7.3 | 0.4 | 9.0 | | | | | | | |
| 16 | 40.7 | 4.9 | | 12.2 | 0.4 | | | | | | | | |
| 17 | 40.7 | | | 12.2 | 0.4 | 9.0 | | | | | | | |
| 18 | 40.7 | 4.9 | | 7.3 | 0.4 | | | | | | | | 9.0 |
| 19 | 40.7 | 4.9 | | 7.3 | 0.4 | | | | 9.0 | | | | |

*Flammability of examples in the table*

1. Burned sluggishly
2. Burned very sluggishly
3. Would not burn
4. Burned actively
5. Burned sluggishly
6. Burned sluggishly
7. Burned sluggishly
8. Burned sluggishly
9. Burned sluggishly
10. Burned sluggishly
11. Burned sluggishly
12. Would not burn
13. Would not burn
14. Would not burn
15. Would not burn
16. Burned sluggishly
17. Would not burn
18. Would not burn
19. Would not burn The "Soft alkyd resin" in the table may be any of the soft non-drying alkyd resins compatible with cellulose derivatives. Such commercial products as Esterol 3155 (a non-drying-oil-extended alkyl resin), Beckosol 24 (an unmodified such as supported or unsupported films, filaments, fibers, rods, and various articles of molded material.

What I claim and desire to protect by Letters Patent is:

1. A plastic, substantially nonflammable composition, free from volatile solvents, comprising essentially ethyl cellulose, a compatible plasticizer therefor, and about 15% by weight of the composition of a water-insoluble heavy metal oxalate.

2. A plastic, substantially nonflammable composition, free from volatile solvents, comprising essentially ethyl cellulose, tricresyl phosphate, and about 15% by weight of the composition of a water-insoluble heavy metal oxalate.

WILLIAM W. KOCH.